July 10, 1934.  R. D. ROSS  1,966,222
CURRENT CONTROLLING SYSTEM
Filed Dec. 9, 1932
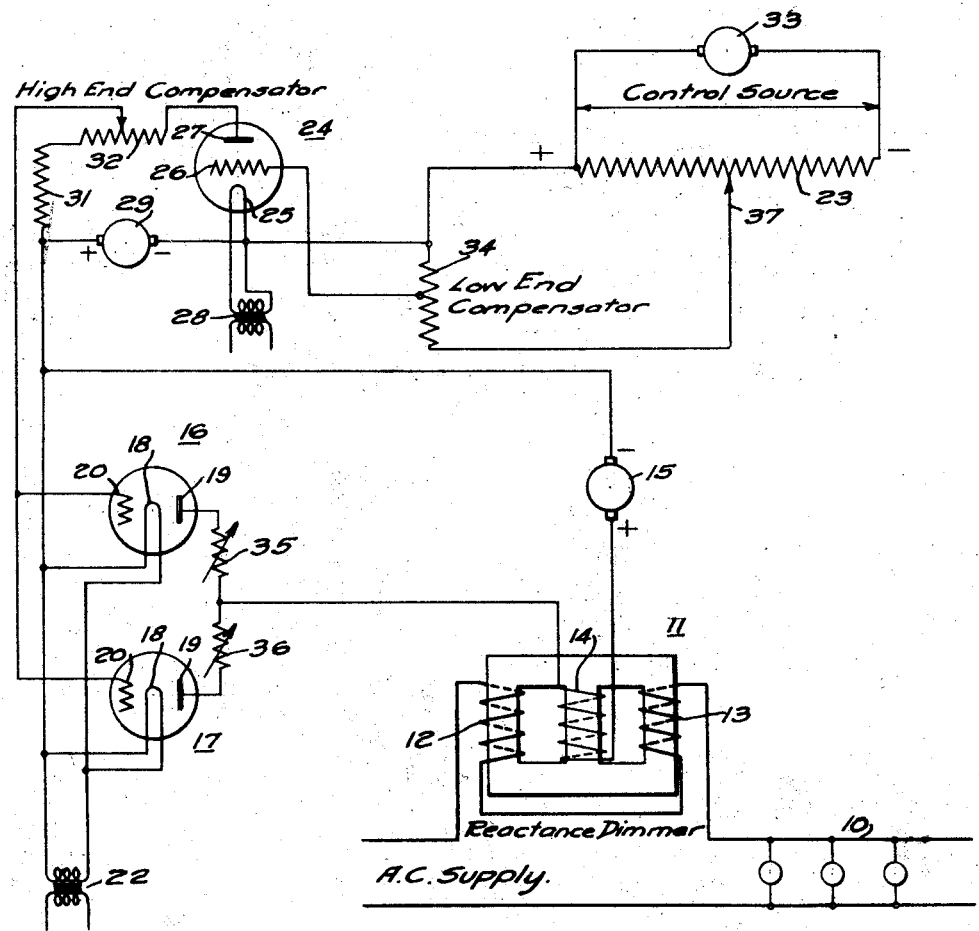
WITNESSES:
INVENTOR
Robert D. Ross.
ATTORNEY Patented July 10, 1934

1,966,222

UNITED STATES PATENT OFFICE 1,966,222

CURRENT CONTROLLING SYSTEM

Robert D. Ross, Norfolk, Va., assignor to Westinghouse Electric & Manufacturing Company, East Pittsburgh, Pa., a corporation of Pennsylvania Application December 9, 1932, Serial No. 646,413

9 Claims. (Cl. 175—312)

My invention relates, generally, to current controlling systems and more particularly, to systems for controlling the current in theatre lighting circuits and also in flood lighting or other ornamental lighting circuits.

Various systems have been developed for controlling the current in an electric circuit, as, for example, a theatre lighting circuit, in which the intensity of illumination is controlled by a three-legged reactor having an alternating current winding on each of the two outer legs and a direct-current control winding on the center leg. The flux from the direct current control winding saturates the iron in the magnetic circuit, thereby greatly reducing the impedance of the reactor, when the control winding is energized. The alternating-current windings on the reactor are connected in series with the lamps in the lighting circuit and the current flowing through the lamps is regulated by varying the impedance of the reactor which, in turn, is controlled by varying the current in the control winding on the reactor. The current in the control winding may be adjusted by means of a variable resistor connected in series with the control winding; however, greater efficiency and more flexibility of control are obtained by utilizing vacuum tubes or three-electrode valves to control the current in the direct-current winding of the reactor.

An object of my invention, generally stated, is to provide a system for controlling the current in an electric circuit which shall be simple and efficient in operation and which may be economically manufactured and installed.

A more specific object of my invention is to provide a system for regulating the current in an electric circuit by means of a reactor which is controlled by three-element vacuum tubes.

A further object of my invention is to provide a simplified and improved circuit for controlling the output of three-element vacuum tubes.

Other objects of my invention will be described fully hereinafter or will be apparent to those skilled in the art.

For a fuller understanding of the nature and scope of my invention, reference may be had to the following detailed description, taken in connection with the accompanying drawing, in which the single figure is a diagrammatic view of apparatus and circuits connected in accordance with one embodiment of my invention.

Referring to the drawing, a lighting circuit 10 may be supplied with current from any suitable alternating-current source (not shown). The current in the lighting circuit 10 is regulated by a three-legged reactor 11 having alternating-current windings 12 and 13 disposed on its outer legs, and a direct-current control winding 14 on its center leg. The windings 12 and 13 are connected in series-circuit relation and are in series with the lamps in the lighting circuit 10.

As previously explained, the current in the circuit 10 may be regulated by varying the current in the control winding 14, which varies the magnetic flux in the iron core of the reactor and, consequently, varies the impedance of the windings 12 and 13. In this manner the intensity of illumination supplied by the lamps in the lighting circuit 10 may be controlled by regulating the current in the control winding of the reactor 11.

The control winding 14 may be supplied with unidirectional current from a generator 15, or other suitable source, through the medium of two vacuum tubes 16 and 17 which are connected in parallel-circuit relation to provide sufficient capacity for controlling the reactor 11. In installations where only a small number of lamps are in the circuit 10, which permits the use of a small reactor, only one tube will be required to regulate the current in the control winding of the reactor 11.

As shown, the tubes 16 and 17 are of the three-element type, each tube having a filament 18, a plate 19 and a control grid 20. The filaments 18 may be energized from any suitable source, such as a transformer 22. The generator 15 supplies the plate potential for the tubes 16 and 17 and the direct-current energy for the control winding 14 of the reactor 11.

The output of the tubes 16 and 17 is controlled by a potentiometer 23 through the medium of an amplifier tube 24, which is also a three-element tube having a filament 25, a grid 26 and a plate 27. The filament 25 may be energized from a transformer 28, or other suitable source, and the plate potential is supplied by a generator 29. A fixed resistor 31 and a variable resistor 32 are connected in the plate circuit for a purpose which will be hereinafter described. The potentiometer 23 may be energized from the generator 33, or other suitable source of direct-current energy.

In order that the control of the lighting circuit will be effective throughout the entire range of operation of the potentiometer 23, it is necessary to provide a compensator with which the circuit may be adjusted to its minimum brilliancy when the control potentiometer is at its minimum-intensity setting and also another compensator with which the circuit may be adjusted to full brilliancy when the control potentiometer is at its maximum-brilliancy setting. Such adjustments prevent a dead range at the ends of the control potentiometer. A variable resistor 34 is connected in the grid circuit of the tube 24 to provide the low end adjustment, and the variable resistor 32 constitutes the high end adjustment.

After vacuum tubes have been in service, their plate resistance increases and the current output for a certain grid bias and plate potential will be considerably decreased. In order to compensate for this variation in the tube characteristics adjustable resistors 35 and 36 have been introduced in the plate circuits of the power tubes 16 and 17, respectively. When the tubes are new, most of this resistance is connected in the plate circuits and as the tubes age it is reduced, thereby compensating for an increasing resistance in the internal circuit of the vacuum tubes by removing resistance from the external circuit.

In the embodiment of the invention illustrated, the current in the lighting circuit 10 may be regulated by varying the position of the movable arm 37 of the potentiometer 23, thereby varying the potential impressed across the resistor 34 which, in turn, varies the grid biasing potential on the control tube 24. The response in the plate circuit of the control tube follows the grid bias variation, passing maximum current when the grid is at the lowest potential. As the grid potential is increased negatively with respect to the filament, the plate current decreases. The plate circuit of the tube 24 includes the generator 29 and the resistors 31 and 32, therefore, the plate current will cause a voltage drop across the resistors 31 and 32 equal to the current in amperes flowing through the resistors times the value of the resistance in ohms. The voltage drop across the resistors 31 and 32 is applied to the grids 20 of the power tubes 16 and 17, thereby controlling the plate current of these tubes. The current in the plate circuit of the tubes 16 and 17, which includes the generator 15 and the control winding 14 of the reactor 11 is, therefore, proportional to the biasing potential on the grid of the control tube 24. In this manner the current in the lighting circuit 10, and, therefore, the intensity of illumination provided by the lamps in the circuit may be controlled by varying the potential taken from the potentiometer 23.

It will be understood that the control system herein described may be readily utilized in controlling the current in a large number of electrical circuits, as, for example, all of the circuits in a theatre or a flood-lighting installation. Since the generators 15, 29 and 33 and the transformers 22 and 28 may be utilized to provide power for the control equipment of all the circuits in a complete installation, the essential apparatus for controlling each circuit comprises a reactor, three tubes, a potentiometer and the coupling resistors, all of which may be supplied at a comparatively low cost.

The system of control herein described may be readily utilized in conjunction with the apparatus described in the copending application of C. P. West, Serial No. 644,285, filed November 25, 1932, and assigned to the Westinghouse Electric & Manufacturing Company, wherein a variable potential from a potentiometer winding is impressed on a control tube by means of a conducting track which is mounted on a roll of film and makes contact with the potentiometer in a manner to receive a potential which varies in accordance with a predetermined program. Such a scheme is particularly adapted to the control of flood lighting circuits. The present system may also be utilized in theatre lighting control in which a plurality of potentiometers, which are preset in accordance with the illumination requirements for the various scenes of a theatrical production, are provided.

From the foregoing description it is apparent that I have provided a simple, efficient and flexible system for controlling the current in an electric circuit and one which is especially suitable for controlling the intensity of illumination supplied by the various circuits in a theatre or in flood-lighting or other ornamental lighting installations.

I do not desire to be restricted to the specific embodiment of my invention herein shown and described, since it is evident that it may be changed and modified without departing from the spirit and scope of my invention as defined in the appended claims.

I claim as my invention:

1. In a lighting control system, in combination, a lighting circuit, a source of energy for the lighting circuit, a reactor having a control winding for controlling the current in the lighting circuit, a source of energy for the control winding, a three-element vacuum tube for controlling the energization of the control winding, a three-element control tube for controlling the output of the vacuum tube, presettable means for impressing a variable potential upon the grid of the control tube to control the current output of the vacuum tube, and compensating means for increasing the effective range of operation of the presettable means, whereby the current in the lighting circuit may be regulated.

2. In a lighting control system, in combination, a lighting circuit, a source of energy for the lighting circuit, a reactor having a control winding for controlling the current in the lighting circuit, a source of energy for the control winding, a plurality of three-element vacuum tubes for controlling the energization of the control winding, a three-element control tube for controlling the output of the vacuum tubes, potentiometer means for impressing variable potential values upon the grid of the control tube to control the current output of the vacuum tubes, and compensating means for increasing the effective range of operation of the potentiometer means, whereby the current in the lighting circuit may be regulated.

3. In a lighting control system, in combination, a lighting circuit a source of alternating current energy for the lighting circuit, a reactor having a direct-current control winding for controlling the current in the lighting circuit, a source of direct-current energy for the control winding, a plurality of three-element vacuum tubes connected in parallel circuit relation for controlling the energization of the control winding, a three-element control tube for controlling the output of the vacuum tubes, presettable means for impressing a variable potential upon the grid of the control tube to control the current output of the vacuum tubes, and compensating means for increasing the effective range of operation of the presettable means, whereby the current in the lighting circuit may be controlled.

4. In a current control system, in combination, an electric circuit, a source of energy for the electric circuit, a magnetic amplifier for controlling the current in the electric circuit, a three-element vacuum tube for controlling the energization of the magnetic amplifier, a three-element control tube for regulating the output of the vacuum tube, presettable means for impressing a variable potential upon the grid of the control tube to regulate the output of the vacuum tube, and compensating means for increasing the effective range of operation of the presettable means, whereby the current in the electric circuit may be controlled.

5. In a current control system, in combination, an electric circuit, a source of alternating-current energy for the electric circuit, a variable reactor for controlling the current in the electric circuit, a control winding for controlling the reactance of the reactor, a three-element vacuum tube for controlling the energization of the control winding, a three-element control tube for controlling the output current of the vacuum tube, a variable potentiometer for impressing a potential upon the grid of the control tube to regulate the output of the vacuum tube, and means for increasing the effective range of operation of the potentiometer, whereby the current in the electric circuit may be controlled.

6. In a lighting control system, in combination, a lighting circuit, a source of alternating-current energy for the lighting circuit, a reactor having a direct-current control winding for regulating the current in the lighting circuit, a source of direct-current energy for the control winding, a three-electrode valve for regulating the current in the control winding, a three-element control tube for controlling the grid potential of the three-electrode valve to control the output current thereof, means for energizing the plate circuit of the control tube, potentiometer means for impressing a variable potential upon the grid of the control tube to regulate its plate current, and means for increasing the effective range of operation of the potentiometer means, whereby the output current of the three-electrode valve may be regulated and the current in the lighting circuit may be controlled.

7. In a lighting control system, in combination, a lighting circuit, a source of alternating-current energy for the lighting circuit, a reactor having a direct-current control winding for regulating the current in the lighting circuit, a source of direct-current energy for the control winding, a three-electrode valve for regulating the current in the control winding, a three-element control tube for controlling the grid potential of the three-electrode valve to control the output current thereof, resistance coupling means interposed between the control tube and the three-electrode valve, means for energizing the plate circuit of the control tube, presettable means for impressing a variable potential upon the grid of the control tube to regulate its plate current, and compensating means for increasing the effective range of operation of the presettable means, whereby the output current of the three-electrode valve may be regulated and the current in the lighting circuit may be controlled.

8. In a lighting control system, in combination, a lighting circuit, a source of alternating-current energy for the lighting circuit, a reactor having a direct-current control winding for regulating the current in the lighting circuit, a source of direct-current energy for the control winding, a three-electrode vacuum tube for regulating the current in the control winding, a three-element control tube for controlling the grid potential of the vacuum tube to control the output current thereof, a source of direct-current energy for energizing the plate circuit of the control tube, resistance coupling means disposed in the plate circuit of the control tube, presettable means for imposing a variable potential upon the grid of the control tube to regulate its plate current, and compensating means for increasing the effective range of operation of the presettable means, whereby the output current of the vacuum tube may be regulated and the current in the lighting circuit may be controlled.

9. In a lighting control system, in combination, a lighting circuit, a source of alternating current energy for the lighting circuit, a reactor having a direct-current control winding for regulating the current in the lighting circuit, a source of direct-current energy for the control winding, a three-electrode vacuum tube for regulating the current in the control winding, said control winding being connected in the plate circuit of the vacuum tube, variable resistance means connected in the plate circuit of the vacuum tube to compensate for variation in the tube characteristics, a three-element control tube for controlling the output current of the vacuum tube, presettable means for impressing a variable potential upon the grid of the control tube, and compensating means for increasing the effective range of operation of the presettable means, whereby the grid potential of the vacuum tube is controlled and the current in the lighting circuit may be regulated.

ROBERT D. ROSS.